United States Patent [19]

Shoji

[11] Patent Number: 4,775,414

[45] Date of Patent: Oct. 4, 1988

[54] INORGANIC ADHESIVE

[75] Inventor: Takashi Shōji, Saitama, Japan

[73] Assignee: Showa Denko Kabushiki Kaisha, Tokyo, Japan

[21] Appl. No.: 66,670

[22] Filed: Jun. 26, 1987

[30] Foreign Application Priority Data

| Jun. 26, 1986 | [JP] | Japan | 61-150003 |
| Jun. 26, 1986 | [JP] | Japan | 61-150004 |
| Jun. 26, 1986 | [JP] | Japan | 61-150005 |
| Sep. 30, 1986 | [JP] | Japan | 61-232803 |
| Dec. 3, 1986 | [JP] | Japan | 61-288191 |

[51] Int. Cl.$^4$ .............................................. B22F 1/00
[52] U.S. Cl. .................................... 75/247; 75/246; 75/255; 106/1.19; 106/403; 252/513; 252/514
[58] Field of Search ............... 75/255, 246, 247; 252/513, 514; 106/1.19, 290

[56] References Cited

U.S. PATENT DOCUMENTS 3,859,087  1/1975  Backstrom ..................... 75/246
4,440,572  4/1985  Nadkarni et al. ............... 75/232
4,552,691 11/1985  Shoji et al. .................... 252/514
4,591,535  5/1986  Mizuhara ...................... 428/627
4,606,981  8/1986  Mizuhara ...................... 428/606
4,623,513 11/1986  Mizuhara ...................... 420/470
4,630,767 12/1986  Mizuhara ...................... 228/122

Primary Examiner—Stephen J. Lechert, Jr.
Attorney, Agent, or Firm—Sughrue, Mion, Zinn, Macpeak & Seas

[57] ABSTRACT

Inorganic adhesives suitable for bonding metals to metals, metals to ceramics, or ceramics to ceramics with high bonding strength are disclosed, which contain a composite mechanical alloy powder comprising:

(a) from about 10 to 60 wt % of particles of at least one of Cu and Ni;
(b) from about 10 to 80 wt % of particles of at least one of Ti, Nb, and Zr; and
(c) from about 10 to 80 wt % of Ag particles.

The composite powder can be dispersed in an organic solvent to form a paste adhesive.

26 Claims, 1 Drawing Sheet

INORGANIC ADHESIVE

FIELD OF THE INVENTION

The present invention relates to inorganic adhesives which are suitable for bonding metal to metal, metal to ceramic, or ceramic to ceramic.

BACKGROUND OF THE INVENTION

Various methods have been previously known for bonding materials of the same kind, such as metals to metals or ceramics to ceramics, or materials of different kinds, such as metals to ceramics.

For instance, fusion welding methods for bonding metals to metals include electric welding, gas welding, friction welding, diffusion welding, etc. Further, conventional methods include brazing treatment or adhesion with organic adhesives, in which substrates are not melted.

Also, known methods include adhesion with organic adhesives or heat-resistant metallic adhesives for bonding ceramics to ceramics, as disclosed in Japanese patent application (OPI) No. 58870/86. (The term "OPI" as used herein means an "unexamined published Japanese patent application.")

Apart from bonding materials of the same kind, known adhesion methods include organic adhesives, active metallic adhesives, shrinkage fitting methods, solid phase-reacting adhesives, etc. for bonding materials of different kinds such as metals to ceramics. Further a heat-resistant metallic bond can be produced by metallizing a ceramic substrate with Mo or W, plating it with a nickel plate, and then soldering it to a metal substrate. Recently, a bonding technique has been developed utilizing a chemical reaction in which an inorganic oxide series adhesive is used for formation of a hydrate compound.

However, all of the above-mentioned bonding methods, except fusion welding which is an inherent method for bonding metal to metal, have the defects that the bonds are weak under heat and the adhesion strength is not sufficient.

On the other hand, other bonding techniques have been proposed by means of evaporation plating, sputtering, metal spraying, etc. or by the use of foil-shaped insert materials. These are, however, hardly practical and commercially unsatisfactory, since not only is the adhesion strength inadequate, but also the field of application is limited.

In particular, for bonding combinations including a ceramic material, such as a ceramic to a ceramic or a ceramic to a metal, for example, where a substrate of SiC or graphite is bonded with another substrate of a ceramic material (such as SiC or alumina) or a metal, there is no practical method at present except the general use of organic adhesives. The use of organic adhesives is, however, not practical, since the environment for their use is restricted to about 150° C. or below because of the characteristics of the SiC or graphite substrate and of organic adhesives. Further, the bonded parts have poor weather-resistance and insufficient strength.

The present inventors have earnestly studied the improvement of heat resistance in metallic material adhesive, and methods for increasing especially the adhesion strength of metallic material adhesives, and, as a result, have found that the mere regulation of the chemical components of the adhesive, such as in conventional metallic brazing materials (e.g., Japanese patent publication No. 10235/86), results in the materials having limited use, and further is not sufficient for satisfying the requirements for improved heat-resistance and adhesion strength.

SUMMARY OF THE INVENTION

An object of the present invention is to overcome the defects of conventional adhesives and to provide novel adhesives which have improved heat-resistance and strong adhesion strength, which can be utilized with ease not only for bonding materials of the same kind, such as metals to metals or ceramics to ceramics, but also for bonding materials of different kinds such as metals to ceramics while meeting practical and economical requirements.

As a result of the inventors further repeated experiments and studies not only on the regulation of the chemical components of adhesives but also on the essential point of their physical structure, it has now been found that this and other objects of the present invention are attained by adhesives with a powdery structure which have a special composition containing an essential component of Ag in admixture with other selected components.

Accordingly, the present invention provides inorganic adhesives consisting essentially of a composite mechanical alloy powder which comprises (a) from about 10 to 60% by weight of particles of at least one of Cu and Ni, (b) from about 10 to 80% by weight of particles of at least one Ti, Nb, and Zr, and (c) from about 10 to 80% by weight of Ag particles, and optionally contains particles of a rare earth element, Si, and SiC. The inorganic adhesives may be in the form of powder, shaped body, or paste.

DETAILED DESCRIPTION OF THE INVENTION

The present invention is now explained in greater detail.

The inorganic adhesives of the present invention contain metallic components, and various experiments and studies were carried out on the mechanical structure of a base composition containing the three-component series Cu—Ti—Ag, in consideration of the main components of silver brazing materials, nickel brazing materials, copper brazing materials, and the like which are the main component series of conventional metal brazing materials.

In these studies, an alloy of the three components Cu, Ti, and Ag, a simple blended powder containing mixture of the three components, and a composite powder formed by mechanically bonding fine powders of the three components by mechanical alloying means were prepared. Further, any variation of the physical structure of each metallic substance in these states at the bonding temperature (i.e., the temperature of the substance in actual use) was investigated, to test bonding effect.

Figures 2, 3:
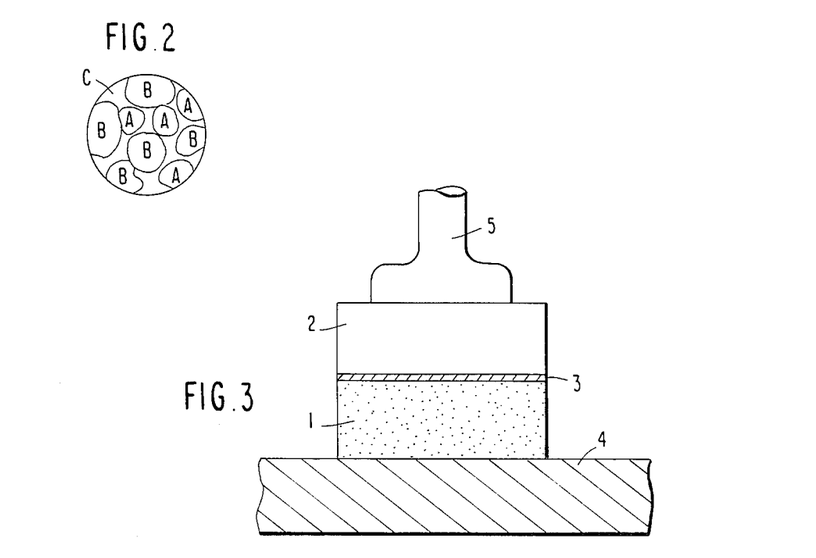
FIG. 2 illustrates the powdery structure of one embodiment of an inorganic adhesive of the present invention.
FIG. 3 explains a method of measuring the bonding strength of the adhesive layer formed from the adhesive of the present invention.

Although no special improvement in the bonding effect was discovered when using the alloy or the blended powder regardless of bonding temperature, a surprising and extreme improvement in bonding strength was discovered when using composite powders at appropriately selected bonding temperatures. Although not desiring to be bound by theory, it is considered that because the fine powders of the respective components are mechanically bonded, as shown in FIG. 2, the fine powders of the respective components which are densely adjacent to one another become molten on the surfaces of the powder particles at the bonding temperature to strengthen the bond between the particles. The thus-strengthened intergranular bond serves to enlarge the bonding strength of the composite powder. In this connection, in the case of the alloyed form where the respective components were alloyed at a higher temperature than the proper bonding temperature (800° to 900° C. in the case of an Ag—Cu system), the bonding effect obtained was significantly decreased. In addition, when using the simple blended form, improved bonding could not be attained even under heat, as the respective components were merely blended in a dispersed state.

When a shaped body was obtained by compacting the composite powder under pressure, the bonding strength was improved, and in particular, the improvement was more remarkable when it was in the form of a sintered compact or a sintered and rolled sheet.

The range of the chemical components which can be used in the adhesive composite material is now described in greater detail.

Figure 1:
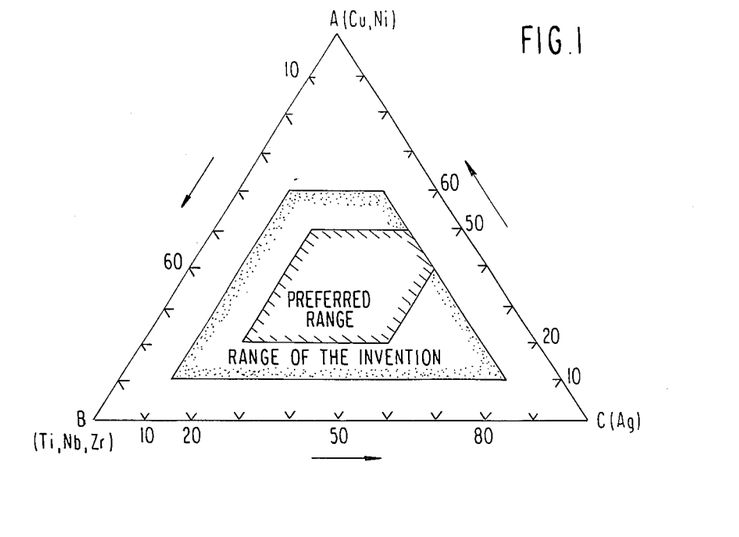
FIG. 1 shows the composition range of the composite mechanical alloy powder of the present invention.

FIG. 1 shows the component series of the composite powder in the inorganic adhesives of the present invention and the composition range (wt%) thereof, where component (a) is particles of at least one of Cu and Ni, component (b) is particles of at least one of Ti, Nb, and Zr, and the balance may be component (c), i.e., Ag particles. Components (a), (b), and (c) are substantially pure metal particles and do not include alloy particles. In the component series, the composition range where component (a) is from about 10 to 60 wt%, component (b) is from about 10 to 80 wt%, and component (c) is from about 10 to 80 wt%, provides suitable adhesives having the desired properties. If component (a) exceeds about 60 wt%, the composition is no longer suitable as an adhesive. If component (b) exceeds about 80 wt%, the hardness of the bonded layer becomes undesirably too high, resulting in poor resistance to thermal shock. Therefore, compositions exceeding the respective upper limits are not preferred.

A range which is especially preferred for attaining both heat-resistance and adhesion strength is from about 20 to 50 wt% of component (a), from about 10 to 60 wt% of component (b) and from about 20 to 50 wt% of component (c).

In composite materials according to the present invention, sponge titanium powder and carbonyl nickel powder are preferably used as the Ti and Ni components, respectively.

In particular, the inorganic adhesives containing Ni as component (a) are suitable for adhesion of stainless steel plates.

If desired, the above-mentioned component series may further contain at least one of rare earth elements (including La, Lanthanide, and Y) (hereinafter referred to as "component (d)"), as the case may be. The amount of component (d) to be added is from about 5 ppm by weight to about 3 wt%, and a Misch metal e.g., alloy of 50% of Ce and 50% of La, Nd, etc. can be used. By the addition of component (d), the lower limit of the amount of component (b) present may be reduced to about 7 wt%, and in particular, suitable bonding strength can be obtained even though the amount of the Ti in the composition is lowered. In addition, the addition of component (d) is especially effective for an adhesive composition used for bonding ceramic substrates such as SiC or graphite.

For bonding ceramic substrates such as SiC, a composite powder that consists essentially of from about 25 to 35 wt% (more preferably about 30 wt%) of Cu and from about 5 to 15 wt% (more preferably about 10 wt%) of Ni as component (a), from about 15 to 25 wt% of component (b), from about 35 to 45 wt% of component (c), and from about 1 to 7 wt% of Si (component (e)) was also found preferable.

When component (b) contains Ti, the metal forms a TiC layer at the interface of a substrate SiC, but the TiC layer has insufficient bonding strength. Therefore, it is desirable to form a (Ti,Si)C composite carbide layer at the SiC interface by the addition of Si, which is described hereinafter, in order to improve the bonding strength. The use of Zr or Nb (or a combination thereof) in place of Ti, is also effective to attain the same result.

Si is added as an Si source for the formation of the (Ti,Si)C composite carbide layer in the SiC interface.

Ni, Ag, and Cu serve as brazing materials in the invention Ni—Ag—Cu series adhesive composition, and intensify the bonding strength. In addition, Ni is effective, especially when the adhesive composition is used for bonding the combination of a copper plate and a metal, for preventing the metal substrate from peeling during the step of cooling after the bonding operation. The presence of Ni reduces the difference in thermal expansion coefficient between the copper plate and the metal. Cu is effective for lowering the bonding temperature.

The addition of an appropriate amount of SiC (component (f)) to the Ni—Ag—Cu series adhesive composition is also preferred for bonding an SiC substrate, as the thermal expansion coefficient of the adhesive composition can be made close to that of SiC, which is one substrate, and the heat-resistance and the thermal shock-resistance are extremely improved. In particular, the adhesive composition consisting essentially of from about 18 to 28 wt% of Cu and from about 5 to 10 wt% of Ni as component (a), from about 10 to 20 wt% of component (b), from about 25 to 35 wt% of component (c), from about 2 to 10 wt% of Si, and from about 10 to 30 wt% of SiC, is especially preferred.

As mentioned above, SiC is a component to be added for the regulation of thermal expansion, especially when one SiC substrate is to be bonded with another substrate. The thermal expansion coefficient of SiC is from 3.5 to $3.8 \times 10^{-6}$/° C., while that of copper as the other substrate is $16.6 \times 10^{-6}$/° C., or that of alumina as the other substrate is from 6 to $9 \times 10^{-6}$/° C. In such cases, the difference in the thermal expansion coefficients of the SiC substrate and the other substrate is great. Because of such great difference in the thermal expansion coefficient, the thermal shock-resistance in the bond is often extremely poor, or a significant warp could occur in the bonded structure, and therefore, the bonding of the SiC substrate necessarily restricts the size or the thickness of the other substrate. In view of these facts, the adhesive composition of the present invention for bonding an SiC substrate preferably contains an appropriate amount of SiC, so that the thermal expansion coefficient of the adhesive composition becomes close to that of the SiC substrate, whereby the heat-resistance and the thermal shock-resistance of the bond are extremely improved. Accordingly, the dimensions (e.g., thickness, size) of the substrate are not restricted but may vary broadly, and sufficient bonding can be attained even though the thickness of the adhesive layer is not made as thin as possible. The SiC-containing adhesive of the present invention are therefore extremely useful.

The composite powder for the inorganic adhesives of the present invention, having the above-mentioned chemical components, is a worked composite metal powder, a so-called "mechanical alloy powder", composed of a plurality of components, one of which is a metal capable of being deformed upon compression such as Cu, Ni, and Ag. The particle of the composite powder is characterized metallographically by a cohesive internal structure composed of starting components intimately united or bonded together, and mutually interdispersed, and the particle has a striated structure and has substantially no internal polosity. Further, the particle of the composite powder has a homogeneous composition. The mean distance between adjacent components in the particle is sufficiently short so that the components easily form an alloy by thermal diffusion when the particle temperature is elevated.

The particle of the composite powder has a flaky shape having an irregular outline and has a low surface area per unit volume, i.e., an average surface area of not greater than about 6,000 cm$^2$ per cm$^3$ of powder and an average particle size of about 50 $\mu$m or less, preferably from about 1 to 20 $\mu$m. In the particle of the composite powder, the comminuted fragments which are kneaded into the host metal component have a size of substantially less than 1 $\mu$m. The composite powder desirably contains a fine powder in an amount of about 50 wt% or more, having a particle size of about 44 $\mu$m or less, preferably about 10 $\mu$m or less.

The composite powder of the present invention can be prepared by a so-called mechanical alloying method, in which metal powders of the respective components are blended and stirred by the use of a stirring machine at a high speed with a high energy for a certain period of time, whereby a composite mechanical alloy powder containing the respective component particles as mechanically bonded therein can be obtained. The mechanical alloying method is a high-energy milling technique as described in U.S. Pat. Nos. 3,591,362 and 3,740,210. To be more specific, the process for producing the composite powder of the present invention comprises providing a mixture of powdered components generally having a particle size of from about 2 to 1,000 $\mu$m, preferably up to about 500 $\mu$m, at least one of which is a deformable metal upon compression such as Ni, Cu, Ag, and compressing the mixture repeatedly using, for example, agitative mill, ball mill, high speed shaker mill, planetary ball mill, or attritor ball mill, under dry condition and at a temperature below the recrystallization points of the components. In the compressing step, it is important that when mechanical energy is applied to the total charge in the mill, substantial portion of attritive elements, e.g., ball element, is kept moving.

To attain such a condition in the mill, it is preferred to satisfy the following requirements:

(a) The volume ratio of the attritive element to the total volume of the charge is high, generally 4/1 or more, and preferably from 12/1 to 50/1.

(b) The ratio of the ball diameter to the average particle diameter of the charged metal powders is high, usually 50/1 or more, and preferably 250/1 or more.

(c) The total volume of the charged metal powders to be milled is substantially less than the dynamic interstitial volume between the balls in the mill.

(d) The attritive elements, e.g., balls, are agitated at the velocity of up to about 300 cm/sec.

(e) Hard metallic or cermet elements or balls, made of, e.g., high alloyed steel, stainles steel, nickel, tungsten carbide, etc., which have a relatively small diameter and essentially the same size are preferably used as a grinding means contained in the mills.

(f) Grinding is effected for a long time to apply sufficient mechnical energy to the charge, generally from 2 to 72 hours.

Throughout the compressing step, the deformable metals in the mixture are subjected to continual kneading by virtue of impact compression with the grinding elements, during which individual metal components making up the starting powdery mixture become comminuted, and fragments thereof are intimately bonded together and become mutually interdispersed to form a composite metal powder.

Next, the preparation of a compacted body containing the above-mentioned composite powder, which is another embodiment of the present invention, is described in greater detail.

In the first step, as the raw materials, pure metal powders of the respective components are used. The powders preferably have a particle size of less than about 200 $\mu$m, and fine powders having a particle size of about 20 $\mu$m or less are especially preferred. The composite powder obtained by the above-mentioned mechanical alloying method is used as the starting material powder for compacted body.

In the second step, the composite metal powder of the above-mentioned components is compacted under a compression of from about 200 to 400 kg/mm$^2$ by the use of a compacting machine to obtain a compacted body. The shape of the compacted body is not particularly limited, and this may be formed into any desired shape which may correspond to the type of adhesive desired.

As another embodiment of the compacted body, the above-mentioned compacted body can be sintered to obtain a sintered compact. For the formation of a sintered compact, for example, the compacted body is preferably sintered in a non-oxidizing atmosphere at from 680° C. to 810° C. If the sintering temperature is too high and the compacted body has turned into alloy, the quality of the resultant adhesive, that is, its bonding effect, would rapidly be reduced, and further, the components such as Ti, Nb, Zr, etc. would often be oxidized. Accordingly, special attention must be paid to the sintering conditions.

As still another embodiment of the compacted body, the above-mentioned sintered compact can be rolled to obtain a sintered and rolled sheet preferably having a thickness of about 1 mm or less.

The inorganic adhesives of the present invention composed of particles in the form of a composite powder state can be used in various ways, and the powdery adhesives are to be used at a determined bonding temperature in consideration of the powdery state thereof and of the inclusion of Ti, Nb, Zr, etc. therein which would be oxidized in air during the bonding operation under heat. As one preferred embodiment of the use of the powdery adhesives, a thin frame is first set on a substrate such as a metal or ceramics and then the adhesive powder is sandwiched between the surfaces of the substrates to be bonded, and thereafter, the thus set substrates are heated and bonded in a non-oxidative atmosphere or in a reduced pressure of $10^{-3}$ Torr or less and under a compression load of from 0.5 to 100 kg/cm². The heating temperature (bonding temperature) varies, depending upon the kind of substrates to be bonded, the composition of the adhesive used, etc., and is, in general, properly selected from the range of from about 600° to 950° C. For instance, when a ferrite is bonded, sufficient adhesion can be attained even at a relatively low temperature of about 600° C. or so. This is believed to be due to the fact that the ferrite surface would be reduced by Ti, Zr, Nb, etc. to give an Fe-phase. If, however, the heat-treatment is effected at a higher temperature than about 950° C., the adhesive used would be alloyed to lower the bonding effect thereof, and therefore, attention must be paid to this point. Specifically, in the case of the inorganic adhesives consisting essentially of the components (a), (b), (c), and optionally (d), the heating temperature is from about 600° to 900° C., preferably from about 700° to 900° C., and more preferably from about 830° to 900° C. In the case of inorganic adhesives for an SiC substrate, the heating temperature is from about 750° to 950° C., preferably from about 830° to 930° C.

The composite powder of the present invention can be dispersed in an organic solvent and can be used in the form of the resulting paste. As the organic solvent, terepineol, butyl carbitol, texanol, butyl carbitol acetate, etc. can be used. The amount of the composite powder in the paste is suitably from about 60 to 90 wt wt%. In addition, 2 wt% or less of a surfactant (e.g., rosin wax) can be added in addition to the organic solvent, or ethyl cellulose can further be added as a binder. As one preferred method of use of the thus-obtained adhesive paste, a necessary amount of the adhesive paste is first coated on one or both bonding surfaces of the substrates to be bonded such as metal, ceramic, and the like, and, after drying, the thus-coated substrates are fired at from about 550° to 600° C. (degreasing temperature) in an inert atmosphere to evaporate the solvent and binder component therefrom and then heated and bonded under the same conditions mentioned above. The amount of the paste to be coated is preferable so regulated that the film thickness after fired may be from about 30 to 60 μm or so. If the film is too thin, the diffusion is insufficient and the required adhesion strength cannot be attained. If, on the contrary, the film is too thick, e.g., exceeding about 500 μm, for example, when the paste is applied to a ceramic substrate, the substrate would be affected severely by the large difference in the thermal expansion between the substrate and the paste, cracking the ceramic substrates bonded. The adhesive paste can be applied or printed on the bonding surface of substrates by any conventional method or a printing means and the thus printed substrates can be bonded, making mass-production of bonded products possible.

As one preferred embodiment for the use of a compacted inorganic adhesive, the compacted adhesive is first sandwiched between the substrates to be bonded such as metal, ceramic, etc., and the substrates are heated and bonded with the adhesive under the same condition as mentioned above.

The following examples are intended to illustrate the present invention but are not to be construed as limiting it in any way. Unless otherwise indicated, all parts, percents and ratios are by weight.

Further, in the Examples, the following starting metal powders were used or composite powders were prepared under the following conditions unless otherwise indicated.

| Starting metal powders: pure metal powders |  |
|---|---|
| Ag powder: | a particle size of 10 μm or less (average particle size of about 2 μm) |
| Cu powder: | a Cu atomized powder of 20 μm or less in size |
| Ti powder: | a sponge Ti powder of 20 μm or less in size |
| Ni powder: | a carbonyl Ni powder of 2 μm or less in size |
| Nb powder: | a particle size of 20 μm or less |
| Zr powder: | a particle size of 20 μm or less |

Mixing condition

A 20 l-pot mill was charged with 500 g of starting metal powders and 5 kg of stainless steel balls of 8 mm in diameter, and mixing was carried out in argon atmosphere for 24 hours.

Condition for forming composite powder 1,000 g of mixed metal powders were charged in a 10 l-attritor mill and was compressed therein with 8 l (total volume) of stainless steel balls of 8 mm in diameter at the rotary speed of agitating element of 500 rpm for 5 hours.

EXAMPLE 1

Different kinds of pure metal fine powders as shown in Table 1 were blended in a determined proportion as shown in the table, and these were admixed and ground with high speed rotar rotation (500 rmp) by the use of an attritor mill for 15 hours to give composite powders having an average particle size of about 2.5 μm (measured with Fisher Sub Sieve Sizer). Each of these powders was shaped into briquettes using a briquetting machine under a pressure of 250 kg/mm² to give coin-shaped briquettes each having a size of 30 mmφ (diameter)×2 mmt (thickness) (Sample Nos. 1 to 10).

Next, the green compact was sandwiched between various materials to be bonded (stainless steel SUS 304, Cu, Ni, Al₂O₃, SiC), each having the same size of 30 mmφ×2 mmt as the green compact, and the resulting test samples were heated and bonded in an atmosphere of a reduced pressure of $10^{-4}$ Torr, at a predetermined temperature (850° C.) for one hour under a compression load of 10 kg/cm².

Ten test pieces of the thus bonded samples were prepared in each test case, and these were dropped onto a steel plate repeatedly three times from a height of 50 cm, whereupon the bonded state was observed. The results are set forth in Table 1.

TABLE 1

| Sample No. | Component (a) Cu (wt %) | Component (a) Ni (wt %) | Component (b) Nb (wt %) | Component (b) Ti (wt %) | Component (b) Zr (wt %) | Component (c) Ag (wt %) | Component (d) Misch metal (wt %) | Substrates bonded[1] | Bonding[2] strength |
|---|---|---|---|---|---|---|---|---|---|
| 1 | — | 10 | — | 80 | — | 10 | — | SUS/Al$_2$O$_3$ | A |
| 2 | 45 | — | — | 10 | — | 45 | — | " | " |
| 3 | 40 | — | — | 40 | — | 20 | — | " | " |
| 4 | 45 | — | — | 7 | — | balance | 3 | " | " |
| 5 | 45 | — | — | — | 9 | " | 1 | " | " |
| 6 | 45 | — | — | 9 | — | " | 1 | " | " |
| 7 | 40 | — | — | 20 | — | 40 | — | Ni/Al$_2$O$_3$ | " |
| 8 | 40 | — | — | 20 | — | 40 | — | Al$_2$O$_3$/Al$_2$O$_3$ | " |
| 9 | 40 | — | — | 20 | — | 40 | — | Cu/SiC | " |
| 10 | 40 | — | — | 19 | — | 40 | 1 | " | " |

(Note)
[1]SUS: Stainless steel SUS 304
[2]A: None of the ten test pieces peeled.

Table 1 indicates that all of the green compacts formed from the composite powders within the scope of the present invention had an excellent bonding strength, and that these could be used for bonding the same or different metals and ceramics.

Regarding heat-resistance, the bonded parts containing the adhesives of the present invention were resistant up to the bonding temperature of the part.

EXAMPLE 2

Sponge titanium powder, silver powder, and copper powder were blended in the proportions shown in Table 2 and were ground in a grinding mill to give a composite powder having a particle size of 10 μm or less. The time required for grinding the mixture (50 g) into the composite powder (particle size: 10 μm or less) was about 3 hours.

Next, the powder was shaped into a disc having a size of 30 mmφ×0.2 mmt, with a compacting machine under a total compression load of 40 tons.

Substrate test pieces each having a size of 30 mmφ×2 mmt were prepared, and the combinations as shown in Table 2 were bonded with the previously prepared adhesive discs. All the substrates for bonding with the graphite substrate had the same surface area. Thickness of SUS, Invar and Cu was 1 mm, and that of alumina and AlN was 0.635 mm. Regarding bonding conditions, the test samples were kept at the bonding temperature as shown in Table 2, for one hour in a vacuum of 10$^{-4}$ Torr, or in an N$_2$ stream, under a compression load of 1 kg/cm$^2$, and after being cooled, the bonded samples were removed at room temperature.

After bonding, the bonding strength of each sample was tested in accordance with a test method described below, and the results are set forth in Table 2.

The test method for the measurement of the bonding strength of the bonded samples was as follows. In the first place, a bonded sample having a size of 10 mm×10 mm was cut and machined with an MEEK cutting machine, and this was set as shown in FIG. 3, whereupon the bonding strength of the sample was measured with a push-pull tester (manufactured by Imada Manufacturing Co.). In FIG. 3, (1) and (2) represent substrates bonded with the bonding material layer (3). A stainless steel plate (4) (SUS 304, 20 mm×50 mm×4 mmt) was stuck to the substrate (1) with an adhesive (Araldite AZ-15 produced by Ciba Co.), and a copper rivet (5) (6 mmφ) was stuck to the other substrate (2) with Araldite AZ-15. In the evaluation of the bonding strength, the mark "—" indicates the case where the graphite substrate was not bonded at all. In the case where the bonded surface was broken, the load applied upon the breakage was indicated. In the case where the copper rivet was broken, it was indicated as "150 kg of more" since the uppermost limit load of the tester was 150 kg.

For testing heat-resistance, the bonded test samples were kept at 900° C. in N$_2$ for one hour, and after being removed from the test atmosphere and cooled, the state of the bonded part was observed to determine whether or not any peeling occurred in the part.

TABLE 2

| Sample No. | Component (a) Cu (wt %) | Component (a) Ni (wt %) | Component (b) Nb (wt %) | Component (b) Ti (wt %) | Component (b) Zn (wt %) | Component (c) Ag (wt %) | Component (d) Misch metal (wt %) | Combination of substrates | Atmosphere and bonding temperature (°C.) | Bonding strength (kg) | Heat-resistance |
|---|---|---|---|---|---|---|---|---|---|---|---|
| 11 | 40 | — | — | 20 | — | 40 | — | graphite/graphite | N$_2$ 850 | 150 or more | good |
| 12 | — | 40 | — | 20 | — | 40 | — | graphite/Cu | " | " | " |
| 13 | 40 | — | 20 | — | — | 40 | — | " | " | " | " |
| 14 | 40 | — | — | — | 20 | 40 | — | " | " | " | " |
| 15 | 20 | — | — | 60 | — | 20 | — | " | " | 138 | " |
| 16 | 40 | — | — | 40 | — | 20 | — | " | " | 123 | " |
| 17 | 10 | — | — | 80 | — | 10 | — | " | " | 87 | " |
| 18 | 40 | — | — | 50 | — | 10 | — | " | " | 57 | " |
| 19 | 25 | — | — | 20 | — | 55 | — | " | " | 105 | " |
| 20 | 45 | — | — | 10 | — | balance | 5 (ppm) | " | " | 73 | " |
| 21 | 45 | — | — | 9 | — | " | 1 | " | " | 141 | " |
| 22 | 45 | — | — | 7 | — | " | 3 | " | " | 128 | " |
| 23 | 45 | — | — | — | 9 | " | 1 | " | " | 135 | " |
| 24 | 40 | — | — | 20 | — | 40 | — | graphite/graphite | " | 150 or more | " |
| 25 | 40 | — | — | 20 | — | 40 | — | graphite/SUS | " | " | " |
| 26 | 40 | — | — | 20 | — | 40 | — | graphite/Invar[1] | " | " | " |
| 27 | 40 | — | — | 20 | — | 40 | — | graphite/Al$_2$O$_3$ | " | " | " |

TABLE 2-continued

| Sample No. | Component (a) Cu (wt %) | Component (a) Ni (wt %) | Component (b) Nb (wt %) | Component (b) Ti (wt %) | Component (b) Zn (wt %) | Component (c) Ag (wt %) | Component (d) Misch metal (wt %) | Combination of substrates | Atmosphere and bonding temperature (°C.) | Bonding strength (kg) | Heat-resistance |
| --- | --- | --- | --- | --- | --- | --- | --- | --- | --- | --- | --- |
| 28 | 40 | — | — | 20 | — | 40 | — | graphite/AlN | " | " | " |
| 29 | 40 | — | — | 20 | — | 40 | — | " | vacuum 850 | " | " |
| 30* | 5 | — | — | 90 | — | 5 | — | graphite/Cu | N₂ 850 | peeled | poor |
| 31* | 65 | — | — | 25 | — | 10 | — | " | " | " | " |
| 32* | 10 | — | — | 5 | — | 85 | — | " | " | " | " |
| 33* | 40 | — | — | 20 | — | 40 | — | " | N₂ 700 | — | " |
| 34* | — | 40 | — | 20 | — | 40 | — | " | N₂ 1000 | fused | " |
| 35* | 40 | — | 20 | — | — | 40 | — | " | N₂ 700 | — | " |
| 36* | 40 | — | 20 | — | — | 40 | — | " | " | — | " |
| 37* | 40 | — | 20 | — | — | 40 | — | " | N₂ 1000 | fused | " |

(Note)
*comparative samples
*¹Iron alloy containing 36% Ni

Table 2 indicates that the each of adhesive samples containing the composite powder within the scope of the present invention had a sufficient bonding strength provided that the bonding temperature was properly selected, i.e., except in cases where the bonding temperatures was too low (Sample Nos. 33, 35, and 36) and the cases where the bonding temperature was too high (Sample Nos. 34 and 37). In addition, the samples of the present invention had a bonding strength of 50 kg or more, even after having been subjected to a heat-cycle test, and thus were proved to be practically durable. On the other hand, although the comparative samples having the chemical components outside the scope of the present invention (Sample Nos. 30 to 32) were composite powder adhesives, they were impracticable for bonding, or if used for bonding, had extremely poor bonding strength.

Up to the present, other adhesives than pitch or tar could not be used for bonding graphite to graphite. In addition, there was no suitable adhesive for bonding graphite to other ceramics than graphite, or to metals, when bonding was performed in a high temperature graphitizing furnace, because the graphite itself has a lubricant property and thus is poor in "wettability" with adhesives. In these conditions, the present invention provides novel adhesives useful for bonding the combinations of graphite to graphite, graphite to other ceramics or graphite to metals, as proved in the present example. In particular, for bonding graphite to graphite, even graphite articles having extremely complicated shapes can easily be bonded with the adhesive of the present invention. The technique of bonding graphite to metals can be adapted to the manufacture of sliding parts, heat-releasing blocks, lining parts, etc. where the lubricating property of graphite is effectively utilized. In addition, the technique of bonding graphite to other ceramics can be adapted to the manufacture of sliding parts where the lubricating property is utilized, abrasion-resistant parts where the abrasion-resistance is utilized, as well as to the manufacture of heat-resistant materials, corrosion resistant materials, etc.

EXAMPLE 3

Metal powders each having a particle size of 44 μm or less, which are shown in Table 3, were blended in the proportion as shown in Table 3 and ground with a grinding stirrer mill for 3.5 hours to give composite powders. The particle size distribution of the thus obtained powders was measured with a Coulter counter (produced by Coulter Electronic Inc.), and 100% of the particles had a particle size of 20 μm or less. More precisely, 83% of the particles had a particle size of 10 μm or less. In addition, observation of the fine particles of the composite powders with a microscope revealed that the metal components were mechanically bonded.

Next, a rubber frame having a thickness of 0.5 mm was set on a stainless steel SUS 304 substrate plate having a size of 50 mm × 50 mm × 2 mmt so as to frame the substrate plate with the rubber frame, and the previously prepared composite powder was filled in the space of the frame to a thickness of 0.5 mm. An alumina plate having the same size was put over the frame and the stainless steel plate, and the alumina plate were heated and bonded. The bonding under heat was effected by imparting a compression load of 10 kg/cm² to the test pieces in a reduced pressure atmosphere of 10⁻⁴ Torr with heating at 900° C for one hour.

Ten test pieces of the thus bonded samples were prepared in each test case, and these were dropped onto a steel plate repeatedly three times from a height of 50 cm, in the same manner as in Example 1, whereupon the bonded state was evaluated from the appearance of the test sample. The results are set forth in Table 3.

In the peeling test, the case where none of the ten test pieces peeled is most preferred, although if one or two of the ten test pieces peeled the sample was nonetheless considered sufficiently valuable for practical use.

TABLE 3

| Sample No. | Component (a) Cu (wt %) | Component (a) Ni (wt %) | Component (b) Nb (wt %) | Component (b) Ti (wt %) | Component (b) Zr (wt %) | Component (c) Ag (wt %) | Component (d) Misch metal (wt %) | Nature of powders | Bonding strength |
| --- | --- | --- | --- | --- | --- | --- | --- | --- | --- |
| 38 | 40 | — | — | 20 | — | 40 | — | composite | A |
| 39 | — | 40 | — | 20 | — | 40 | — | " | " |
| 40 | 40 | — | 20 | — | — | 40 | — | " | " |
| 41 | 40 | — | — | — | 20 | 40 | — | " | " |
| 42 | 20 | — | — | 60 | — | 20 | — | " | " |
| 43 | 30 | — | — | 30 | — | 40 | — | " | " |
| 44 | 40 | — | — | 40 | — | 20 | — | " | " |
| 45 | 45 | — | — | 10 | — | 45 | — | " | " |

TABLE 3-continued

| Sample No. | Component (a) Cu (wt %) | Component (a) Ni (wt %) | Component (b) Nb (wt %) | Component (b) Ti (wt %) | Component (b) Zr (wt %) | Component (c) Ag (wt %) | Component (d) Misch metal (wt %) | Nature of powders | Bonding strength |
|---|---|---|---|---|---|---|---|---|---|
| 46 | 10 | — | — | 80 | — | 10 | — | " | B |
| 47 | 40 | — | — | 50 | — | 10 | — | " | " |
| 48 | 25 | — | — | 20 | — | 55 | — | " | " |
| 49* | 5 | — | — | 90 | — | 5 | — | " | C |
| 50* | 65 | — | — | 25 | — | 10 | — | " | " |
| 51* | 10 | — | — | 5 | — | 82 | — | " | " |
| 52* | 40 | — | — | 20 | — | 40 | — | mixed | " |
| 53* | — | 40 | — | 20 | — | 40 | — | " | " |
| 54* | 40 | — | 20 | — | — | 40 | — | " | " |
| 55 | 45 | — | — | 10 | — | balance | 5 (ppm) | composite | A |
| 56 | 45 | — | — | 10 | — | " | 500 (ppm) | " | " |
| 57 | 45 | — | — | 9 | — | " | 1 | " | " |
| 58 | 45 | — | — | 7 | — | " | 3 | " | " |
| 59 | 45 | — | — | — | 9 | " | 1 | " | " |
| 60 | 45 | — | — | 9 | — | " | 1 | " | " |

(Note)
*comparative samples
*1 A: None of the ten test pieces peeled.
B: One or two of the ten test pieces peeled.
C: Three or more of the ten test pieces peeled.

Table 3 indicates that all the adhesives of the present invention in which a composite powder was used had a good bonding strength. In particular, the adhesives containing the components falling within the preferred composition range as shown in FIG. 1 (Sample Nos. 38 to 45, 55 to 60) had extremely excellent bonding strength.

On the other hand, other samples in which the powder was a mixed powder, even one having the chemical components within the scope of the present invention (Comparative Sample Nos. 52 to 54), or samples having chemical components outside the scope of the present invention, even though the powder therein was a composite powder, (Comparative Samples Nos. 49 to 51), had a poor bonding strength.

Regarding heat-resistance, the parts bonded with the adhesives of the present invention were determined to be resistant to heating up to the bonding temperature.

Next, the composite powder was tested in bonding graphite plates in the same manner as in Example 3.

Substrate test pieces each having a size of 30 mm$\phi \times 2$ mmt were prepared, and the combinations shown in Table 4 were bonded with the previously prepared adhesives. All the substrates bonded with the graphite substrate had the same surface area, and the thickness of these substrates was 1 mm. Regarding the bonding condition, the test samples were kept at the bonding temperature as shown in Table 4, for one hour, in a vacuum of $10^{-4}$ Torr or in an $N_2$ stream, under a compression load of 1 kg/cm$^2$, and after being cooled, the bonded samples were taken out at room temperature.

After bonding, the bonding strength of each sample was tested in the same manner as in Example 2. In addition, the samples were subjected to the heat-resistance test in the same manner as in Example 2. The test results are set forth in Table 4.

TABLE 4

| Sample No. | Component (a) Cu (wt %) | Component (a) Ni (wt %) | Component (b) Nb (wt %) | Component (b) Ti (wt %) | Component (c) Ag (wt %) | Component (d) Misch metal (wt %) | Combination of substrates | Atmosphere and bonding temperature (°C.) | Bonding strength (kg) | Heat-resistance |
|---|---|---|---|---|---|---|---|---|---|---|
| 61 | 30 | — | — | 30 | 40 | — | graphite/graphite | $N_2$ 850 | 150 or more | good |
| 62 | 45 | — | — | 10 | 40 | — | graphite/Cu | " | 75 or more | " |
| 63 | 45 | — | — | 10 | balance | 500 (ppm) | " | " | 104 or more | " |
| 64 | 45 | — | — | 9 | " | 1 | " | " | 121 or more | " |
| 65* | 5 | — | — | 90 | 5 | — | " | " | peeled | poor |
| 66* | 65 | — | — | 25 | 10 | — | " | " | " | " |
| 67* | 10 | — | — | 5 | 85 | — | " | " | — | " |
| 68* | 40 | — | — | 20 | 40 | — | " | $N_2$ 700 | — | " |
| 69* | — | 40 | — | 20 | 40 | — | " | $N_2$ 1000 | fused | " |
| 70* | 40 | — | 20 | — | 40 | — | " | $N_2$ 700 | — | " |
| 71* | 40 | — | 20 | — | 40 | — | " | " | — | " |
| 72* | 40 | — | 20 | — | 40 | — | " | $N_2$ 1000 | fused | " |

(Note)
*comparative samples

EXAMPLE 4

Sponge titanium powder, silver powder and copper powder were blended in the proportion as shown in Table 4 and were ground in a grinding mill to give a composite powder having a particle size of 10 μm or less. The time required for grinding the mixture (50 g) into the composite powder (particle size: 10 μm or less) was about 3 hours.

Table 4 indicates that the adhesive samples containing a composite powder having chemical components within the scope of the present invention had a sufficient bonding strength, provided that the bonding temperature was properly selected, i.e., except when the bonding temperature was too low (Sample Nos. 68, 70, and 71) or the bonding temperature was too high (Sample Nos. 69 and 72). In addition, the samples of the present invention had a bonding strength of 50 kg or more, even after having been subjected to the heat-resistance test, and thus were proved to be practically durable. On the other hand, the comparative samples having chemical components outside the scope of the present invention (Sample Nos. 65 to 67), even though composite powder adhesives, were impracticable for bonding, or if used for bonding, had extremely poor bonding strength.

EXAMPLE 5

Sponge titanium powder, silver powder, copper powder, and Misch metal powder (containing 50% of Ce and 50% of La and Nd), each having a particle size of 326 mesh (44 μm) or less, were blended in the proportion as shown in Table 5 and were ground in a ball mill to give a composite powder having a particle size of 10 μm or less.

to evaporate the solvent and binder component from the paste film. In the reference samples of Table 5, the paste was fired at a high temperature of 800° C. or 900° C., whereby the paste lost its adhesive properties.

After firing, another unprinted substrate was put over the paste film-coated substrate, the combination of the substrates being shown in Table 5, and the two substrates were heated and bonded at a predetermined temperature of 900° C. for one hour in vacuum of $10^{-4}$ Torr under a compression load of 10 kg/cm$^2$.

Ten test pieces of the thus-bonded samples were prepared in every test case, and these were dropped onto a steel plate repeatedly three times from a height of 50 cm, whereupon the bonded state was determined from the appearance of the test sample. The results are set forth in Table 5.

TABLE 5

| Sample No. | Component (a) | | Component (b) | | | Component (c) | Component (d) | Sintering temperature (in N$_2$) (°C.) | Bonding temperature (°C.) | Combination of substrates | Bonding*[2] strength |
|---|---|---|---|---|---|---|---|---|---|---|---|
| | Cu (wt %) | Ni (wt %) | Ti (wt %) | Zr (wt %) | Nb (wt %) | Ag (wt %) | Misch metal (wt %) | | | | |
| 73* | — | — | 100 | — | — | — | — | 600 | 900 | Cu/Al$_2$O$_3$ | C |
| 74 | 10 | — | 80 | — | — | 10 | — | " | " | " | A |
| 75 | 40 | — | 20 | — | — | 40 | — | " | " | " | " |
| 76 | 45 | — | 10 | — | — | 45 | — | " | " | " | B |
| 77 | 45 | — | 9 | — | — | 45 | 1 | " | " | " | A |
| 78 | 40 | — | 20 | — | — | 40 | — | " | " | SUS/SS*[1] | " |
| 79 | 40 | — | 20 | — | — | 40 | — | " | " | Al$_2$O$_3$/Al$_2$O$_3$ | " |
| 80 | 40 | — | 20 | — | — | 40 | — | " | " | Cu/SiC | " |
| 81** | 40 | — | 20 | — | — | 40 | — | 800 | " | Cu/Al$_2$O$_3$ | C |
| 82** | 40 | — | 20 | — | — | 40 | — | 900 | " | " | " |
| 83 | — | 40 | 20 | — | — | 40 | — | 600 | " | SUS/SiC | A |
| 84 | 40 | — | — | 20 | — | 40 | — | " | " | Cu/Al$_2$O$_3$ | " |
| 85 | 40 | — | — | — | 20 | 40 | — | " | " | " | " |

(Note)
*comparative samples
**reference samples
*[1]SS: General structural rolled steel SS 34
*[2]A: None of the ten test pieces peeled.
B: One or two of the ten test pieces peeled.
C: Three or more of the ten test pieces peeled.

Next, the composite powder was kneaded together with the following components in the proportion as shown below in a three-roll mill to give a paste.

| Composite powder | 24 parts by weight |
|---|---|
| Ethyl cellulose | 4.4 parts by weight |
| Texanol | 5 parts by weight |
| Polyoxyethylene nonylphenol ether (surfactant) | 0.54 parts by weight |

Next, the resulting paste was printed on one substrate to be bonded, which had a size of 50 mm × 50 mm, with a screen-printer. The thickness of the printed paste film was 30 μm and the area thereof was 49 mm × 49 mm. The combinations of the substrates bonded are given in Table 5. The screen used for printing was made of a stainless steel bias sieve of 200 mesh, which was patterned to give an emulsion print having a thickness of 45 μm and an area of 49 mm × 49 mm.

After printing, the paste film was leveled at room temperature for 10 minutes and then dried at 105° C. for 30 minutes. The dried film was then fired in a thick film-firing furnace under a nitrogen atmosphere. If the firing was at a higher temperature of 700° C. and above, it was found that the resulting adhesive lost its adhesive properties. Accordingly, the peak temperature in the firing in the present example was 600° C. for 8 minutes, and the sample fired was thereafter cooled to room temperature for 60 minutes. The object of the firing was Table 5 proves that adhesive pastes formed from the composite powder of the present invention can effectively be used for bonding substrates, provided that the paste is properly applied to the substrates. Even when the paste of the present invention is applied to only one surface of the substrates to be bonded, the bonding strength was sufficient. On the other hand, the comparative adhesive paste comprising only Ti powder (Sample No. 73) could not bond the substrates.

In addition, the paste of the present invention was printed on the surfaces of both substrates to be bonded and these were bonded as above, whereupon the bonding strength increased.

EXAMPLE 6

In the same manner as in Example 5, various composite powders as shown in Table 6 were prepared, and these were formed into pastes having the following composition.

| Composite powder | 24 parts by weight |
|---|---|
| Acrylic resin | 4.4 parts by weight |
| Terepineol | 5 parts by weight |
| Polyoxyethylene nonylphenol ether (surfactant) | 0.54 parts by weight |

Next, the substrates as shown in Table 6 were first degreased in an N$_2$ stream at 400° C., and the previously prepared paste was printed on the surface of one substrate to be bonded in the same manner as in Example 5 (except that the thickness of the printed paste was varied). After drying and firing, the substrates were bonded, the combination of the substrates being given in Table 6, and the bonding strength of each of the thus-bonded samples was investigated.

In the present experiment, the paste was diluted with terepineol so that the thickness of the adhesive, after firing, was 15 μm or less. When the thickness of the adhesive, after firing, was 30 μm or more, the printing operation was repeated, after the previous print had been dried, until the finally printed paste film had the desired thickness. The time used for the bonding operation was 30 minutes, unless otherwise specifically described. The results are set forth in Table 6.

were blended and ground in a grinding mill for about 3 hours to obtain a fine composite powder having a particle size of 10 μm or less.

Next, the composite powder was blended with the following components in order to obtain a paste adhesive.

| | |
|---|---|
| Composite powder | 100 g |
| Ethyl cellulose | 18.3 g |
| Texanol | 20.8 g |
| Polyoxyethylene nonylphenol ether (surfactant) | 2.2 g |

141.3 g of the resulting composition was prekneaded in a universal mixer and then kneaded in a three-roll mill

TABLE 6

| Sample No. | Component (a) Cu (wt %) | Component (a) Ni (wt %) | Component (b) Ti (wt %) | Component (b) Zr (wt %) | Component (b) Nb (wt %) | Component (c) Ag (wt %) | Component (d) Misch metal (wt %) | Sintered paste thickness (μm) | Bonding temperature (°C.) | Combination of substrates | Bonding*1 strength |
|---|---|---|---|---|---|---|---|---|---|---|---|
| 86** | 40 | — | balance | — | — | 40 | 1 | 5 | 900 | Cu/Al₂O₃ | C |
| 87** | " | — | " | — | — | " | " | 10 | " | " | B |
| 88 | " | — | " | — | — | " | " | 15 | " | " | A |
| 89 | " | — | " | — | — | " | " | 30 | " | " | " |
| 90 | " | — | " | — | — | " | " | 50 | " | " | " |
| 91 | " | — | " | — | — | " | " | 100 | " | " | " |
| 92 | — | 40 | " | — | — | " | " | " | " | SUS/Al₂O₃ | " |
| 93 | — | " | — | balance | — | " | " | " | " | " | " |
| 94 | 40 | — | balance | — | — | " | " | 30 | " | Cu/SiC | " |
| 95 | " | — | " | — | — | " | " | " | " | Cu/AlN | " |
| 96 | " | — | " | — | — | " | " | " | " | Cu/Si₃N₄ | " |
| 97 | " | — | " | — | — | " | " | " | 600 | Cu/ferrite | " |
| 98** | " | — | " | — | — | " | " | " | 450 × 1 min | Cu/SiC | C |
| 99 | " | — | " | — | — | " | " | " | 850 × 5 min | " | A |
| 100 | " | — | " | — | — | " | " | " | 850 × 10 min | " | " |
| 101** | " | — | " | — | — | " | — | " | " | " | B |
| 102** | " | — | " | — | — | " | — | " | 850 | " | " |
| 103 | " | — | — | balance | — | " | 1 | " | 900 | Cu/Al₂O₃ | A |
| 104 | " | — | — | " | — | " | " | " | " | " | " |
| 105 | " | — | — | — | balance | " | " | " | " | " | " |
| 106 | " | — | — | — | balance | " | " | " | " | " | " |

(Note)
**reference samples
*1A: None of the ten test pieces peeled.
B: One or two of the ten test pieces peeled.
C: Three or more of the ten test pieces peeled.

In Table 6, the bonding strength was insufficient in Sample Nos. 86 and 87 as the paste film was too thin. The adhesive pastes each having a base of Ni—Ag (Sample Nos. 92 and 93) were effective for sufficiently bonding the SUS substrate; and the adhesive paste of Sample No. 97 could bond the Cu substrate to the other ferrite substrate although the bonding temperature was as low as 600° C. Sample No. 98 was ineffective as the bonding temperature was too low; and Sample Nos. 101 and 102 were inferior to Sample Nos. 99 and 100, since the first two did not contain a Misch metal.

In addition, Table 6 shows that adhesive pastes formed from the composite powder of the present invention can effectively be used for bonding various substrates, provided that the paste is properly applied to the substrates. Even when the paste of the present invention is applied to only one surface of the substrate to be bonded, the bonding strength is sufficient.

Regarding heat-resistance, the parts bonded by the adhesives of the present invention were confirmed to be resistant to heating up to the bonding temperature.

EXAMPLE 7

20 g of Ti powder, 40 g of Ag powder and 40 g of Cu powder, each having a particle size of 325 mesh or less to obtain a paste adhesive.

Next, the paste adhesive was printed on the complete surface of one substrate of the combination of the two substrates as shown in Table 7 with a screen-printer, the substrate samples used having the same size as in the above-mentioned Example 5. The screen used for the printing was made of a stainless steel bias sieve of 200 mesh, which gave an emulsion print having a thickness of 45 μm.

After printing, the paste film was leveled at room temperature for 10 minutes and then dried at 105° C. for 30 minutes. After drying, the sample was degreased in a film-firing furnace under a nitrogen stream for 60 minutes, at a peak temperature of 600° C. for 8 minutes.

Next, another substrate was superposed on paste film-coated substrate and was bonded in a vacuum or in a nitrogen stream under a compression load of 0.5 kg/cm². Regarding bonding conditions of this example, the samples were heated at 850° C. for one hour under a vacuum of 10⁻⁴ Torr, or alternatively, the samples were heated for 90 minutes, at a peak temperature of 850° C. for 15 minutes, in a thick film-firing furnace into which a nitrogen stream was fed.

After bonding, the bonding strength of each sample was investigated in the same manner as in Example 2, and additionally, the bonding strength after a heat-resistance test was also investigated. The results are set forth in Table 7.

TABLE 7

| Sample No. | Combination of substrates | Atmosphere and degreasing temperature (°C.) | Film thickness after degreasing (μm) | Atmosphere and bonding temperature (°C.) | Bonding strength (kg) | Heat-resistance |
|---|---|---|---|---|---|---|
| 107 | graphite/graphite | N₂ 600 | 45 | N₂ 850 | 150 or more | good |
| 108 | graphite/SUS | " | 40 | " | " | " |
| 109 | graphite/Cu | " | 15 | " | " | " |
| 110 | graphite/Invar | " | 30 | " | " | " |
| 111 | graphite/Al₂O₃ | " | 28 | " | " | " |
| 112 | graphite/AlN | " | 47 | " | " | " |
| 113 | graphite/Cu | " | 25 | vacuum 850 | " | " |
| 114 | " | " | 31 | " | " | " |
| 115* | " | N₂ 800 | 36 | N₂ 850 | — | poor |
| 116* | " | N₂ 600 | 31 | N₂ 700 | — | " |
| 117* | " | " | 5 | N₂ 850 | 25 | " |
| 118* | " | not degreased | 42 | " | 92 | good |

(Note)
*comparative samples

As shown in Table 7, the bonded surfaces of the samples of the present invention were not damaged or broken. In the bonding strength test, the copper rivet was broken, and the bonding strength of the samples of the present invention was proved to be sufficient. All the samples had a strength which is durable in use under a load of 150 kg or more. On the other hand, if the degreasing temperature was too high (Sample No. 115), or if the bonding temperature was too low (Sample No. 116), the samples could not be bonded. In addition, if the paste film thickness, after degreasing, was too thin (Sample No. 117), or if the sample was not degreased (Sample No. 118), sufficient bonding strength could not be attained. In particular, in Comparative Sample No. 118 which was not degreased, the bonded layer contained air bubbles.

EXAMPLE 8

Sponge titanium powder, carbonyl nickel powder, silver powder, copper powder, and silicon powder (particle size: 44 μm or less) were blended in the proportion (parts by weight) as shown in Table 8 and were ground in a grinding mill to give a composite powder having particle size of 10 μm or less. The time required for grinding the mixture (50 g) into the composite powder (particle size: 10 μm or less) was about 3 hours.

Next, the powder was shaped into a disc having a size of 30 mmφ × 1 mmt, with a compacting machine under a total compression load of 40 tons.

Substrate test pieces each having a size of 300 mmφ × 2 mmt were used to be bonded, and the combinations shown in Table 8 were bonded with the previously prepared adhesive discs. Regarding bonding conditions, the test samples were kept at the bonding temperature as shown in Table 8, for one hour in a vacuum of 10⁻⁴ Torr or in an N₂ stream under a compression load of 1 kg/cm², and then cooled.

After bonding, the bonding strength of each sample was tested in the same manner as in Example 2, and the results are set forth in Table 8.

Table 8 indicates that the adhesive samples of the present invention containing the composite powder having chemical components within the scope of the present invention had a sufficient bonding strength,

TABLE 8

| Sample No. | Chemical components (weight parts) | | | | | Combination of substrates | Bonding temperature (°C.) | Bonding strength (kg) |
|---|---|---|---|---|---|---|---|---|
| | Ti | Ni | Ag | Cu | Si | | | |
| 119 | 20 | 10 | 40 | 30 | 3 | SiC/SUS | 850 | 150 or more |
| 120 | " | " | " | " | " | SiC/Cu | " | 150 or more |
| 121 | " | " | " | " | " | SiC/SiC | " | 150 or more |
| 122 | " | " | " | " | " | SiC/Al₂O₃ | " | 150 or more |
| 123 | " | " | " | " | " | SiC/SUS | 800 | 78 |
| 124* | " | " | " | " | " | " | 700 | — |
| 125* | " | " | " | " | " | " | 1000 | fused |
| 126** | " | " | " | " | 10 | " | 850 | — |
| 127 | " | " | " | " | 5 | " | " | 150 or more |
| 128** | " | " | " | " | 1 | " | " | — |
| 129** | " | — | " | 40 | 3 | " | " | — |
| 130** | " | 20 | " | 20 | " | " | " | — |
| 131** | " | 10 | 60 | — | " | " | " | — |
| 132** | 40 | 15 | 30 | 15 | " | " | " | — |
| 133 | 20 | 10 | 40 | 30 | " | " | " | 150 or more |
| 134 | " | " | " | " | " | SiC/Cu | " | 150 or more |
| 135 | " | " | " | " | " | SiC/SiC | " | 150 or more |
| 136 | " | " | " | " | " | SiC/Al₂O₃ | " | 150 or more |

(Note)
*samples of the invention used to bond the substrate at an inappropriate bonding temperature
**comparative samples provided that the bonding temperature was properly selected, i.e., except in cases where the bonding temperature was too low (Sample No. 124) and cases where the bonding temperature was too high (Sample No. 125). On the other hand, Comparative Sample Nos. 128 to 132, having bonding components outside the scope of the present invention, although composite powder adhesives, were impracticable for bonding.

EXAMPLE 9

20 g of Ti powder, 10 g of Ni powder, 40 g of Ag powder, 30 g of Cu powder and 3 g of Si powder each having a particle size of 325 mesh or less were blended and ground in a grinding mill for about 3 hours to obtain a fine composite powder having a particle size of 10 μm or less.

| | |
|---|---|
| Composite powder | 100 g |
| Ethyl cellulose | 18.3 g |
| Texanol | 20.8 g |
| Polyoxyethylene nonylphenol ether (surfactant) | 2.2 g |

141.3 g of the resulting composition was prekneaded in a universal mixer and then kneaded in a three-roll mill to obtain a paste adhesive.

Next, the paste adhesive was printed on the complete surface of one substrate of the combination of the two substrates as shown in Table 9 with a screen-printer, the substrate samples used having the same size as in the above-mentioned Example 8. The screen used for the printing was made of a stainless steel bias sieve of 200 mesh, which gave an emulsion print having a thickness of 45 μm.

After printing, the paste film was leveled at room temperature for 10 minutes and then dried at 105° C. for 30 minutes. After drying, the sample was degreased in a film-firing furnace under a nitrogen stream for 60 minutes, at a peak temperature of 600° C. for 8 minutes.

Next, another substrate was superposed on the paste film-coated substrate and they were bonded in a vacuum or in a nitrogen stream under a compression load of 1 kg/cm$^2$. Regarding bonding conditions in each case, the samples were heated at 850° C. for one hour under a vacuum of 10$^{-4}$ Torr, or alternatively, the samples were heated for 90 minutes at a peak temperature of 850° C. in a thick film-firing furnace into which a nitrogen stream was fed.

After bonding, the bonding strength of each sample was evaluated in the same manner as in Example 2, and the results are set forth in Table 9. As shown in Table 9, the bonded surfaces of the samples of the present invention were not broken. In the bonding strength test, the copper rivet was broken, and the bonding strength of the samples of the present invention was proved to be sufficient.

TABLE 9

| Sample No. | Combination of substrates | Atmosphere in bonding | Bonding strength (kg) |
|---|---|---|---|
| 137 | SiC/SUS | vacuum | 150 or more |
| 138 | " | N$_2$ | " |
| 139 | SiC/Cu | " | " |
| 140 | SiC/Al$_2$O$_3$ | " | " |
| 141 | SiC/SiC | " | " |

(Note)
SUS: Stainless steel SUS 304

Examples 8 and 9 illustrate cases where the powder constituting the adhesive is exclusively (100%) in the form of a composite powder. The same effect can be attained provided that at least 50 wt% of the powder in the adhesive is in the form of a composite powder. In addition, other ceramics than SiC or Al$_2$O$_3$ and other metals than SUS 304 can be used as the substrate to be bonded to the substrate SiC, and the same bonding effect can also be attained. In particular, the composite powder-containing adhesives of the present invention are especially suitable for bonding composite base plates such as heat-releasing base plates, etc. as well as for bonding heat-resistant and abrasion-resistant base plates such as mold parts for manufacturing of floppy discs or heat-generator parts, etc.

The adhesives composition shown in Table 8 were prepared, except that Ti was replaced by Zr or Nb, and were used in the same manner as in Example 9. As a result, the bonded part had a high bonding strength of 150 kg or more in every case.

EXAMPLE 10

Sponge titanium powder, carbonyl nickel powder, silver powder, copper powder, silicon powder (particle size: 44 μm or less), the SiC powder (particle size: 44 μm or less) were blended in a proportion (parts of weight) as shown in Table 10 and were ground in a grinding mill to give a composite powder having a particle size of 10 μm or less. The time required for grinding the mixture (50 g) into the composite powder (particle size: 10 μm or less) was about 3 hours.

Next, the powder was shaped into a disc having a size of 30 mmφ×0.2 mmt, with a compacting machine under a total compression load of 40 tons.

Substrate test pieces each having a size of 30 mmφ×2 mmt were prepared, and the combinations shown in Table 10 were bonded with the previously prepared adhesive discs. All the substrates used for bonding with the SiC substrate had the same surface area. The thickness of SUS and Cu was 1 mm, and that of alumina was 0.635 mm. Regarding bonding conditions, the test samples were kept at the bonding temperature as shown in Table 10, for one hour in a vacuum of 10$^{-4}$ Torr or in an N$_2$ stream under a compression load of 1 kg/cm$^2$, and after cooling, the bonded samples were taken out at room temperature.

After bonding, the bonding strength of each sample was tested in the same manner as in Example 2, and the results are set forth in Table 10.

In addition, the samples were subjected to a heat-cycle test of 20 heat-cycles by the use of a heat-cycle tester, one heat-cycle including cooling to −55° C. for 30 minutes and heating to +150° C. for 30 minutes. After the heat-cycle test, the bonding strength of each sample was tested in the same manner as above.

TABLE 10

| Sample No. | Chemical components (weight parts) | | | | | | Combination of substrates | Atmosphere and bonding temperature (°C.) | Bonding strength (kg) | Bonding strength after heat- (kg) |
|---|---|---|---|---|---|---|---|---|---|---|
| | Ti | Ni | Ag | Cu | Si | SiC | | | | |
| 142 | 16 | 8 | 32 | 24 | 6 | 14 | SiC/SUS | vacuum 850 | 150 or more | 138 |
| 143 | " | " | " | " | " | " | SiC/Cu | " | " | 97 |
| 144 | " | " | " | " | " | " | SiC/SiC | " | " | 150 or more |
| 145 | " | " | " | " | " | " | SiC/Al$_2$O$_3$ | " | " | " |
| 146 | " | " | " | " | " | " | SiC/SUS | N$_2$ 850 | " | 110 |
| 147 | " | " | " | " | " | " | SiC/Cu | " | " | 83 |
| 148 | " | " | " | " | " | " | SiC/SiC | " | " | 131 |
| 149 | " | " | " | " | " | " | SiC/Al$_2$O$_3$ | " | " | 129 |
| 150 | " | " | balance | " | " | 9 | SiC/Cu | vacuum 850 | 75 | 63 |
| 151 | " | " | " | " | " | 25 | " | " | 53 | 51 |

TABLE 10-continued

| Sample No. | Chemical components (weight parts) | | | | | | Combination of substrates | Atmosphere and bonding temperature (°C.) | Bonding strength (kg) | Bonding strength after heat- (kg) |
|---|---|---|---|---|---|---|---|---|---|---|
| | Ti | Ni | Ag | Cu | Si | SiC | | | | |
| 152 | " | " | " | " | 8 | 14 | " | " | 135 | 102 |
| 153 | " | " | " | " | 3 | " | " | " | 87 | 56 |
| 154 | 12 | " | " | " | 6 | " | " | " | 65 | 54 |
| 155 | 18 | " | " | " | " | " | " | " | 97 | 86 |
| 156* | 16 | " | 32 | " | " | " | " | vacuum 700 | — | — |
| 157* | " | " | " | " | " | " | " | vacuum 1000 | fused | — |
| 158** | " | " | balance | " | " | 0 | " | vacuum 850 | 150 or more | peeled |
| 159** | " | " | " | " | " | 5 | " | " | " | " |
| 160** | " | " | " | " | " | 35 | " | " | 12 | 5.8 |
| 161** | " | " | " | " | 1 | 14 | " | " | — | — |
| 162** | " | " | " | " | 13 | " | " | " | 75 | 9.1 |
| 163** | 8 | " | " | " | 6 | " | " | " | 18 | peeled |
| 164** | 21 | " | " | " | " | " | " | " | 42 | 15.5 |

(Note)
*reference samples (bonding temperature was inappropriate)
**comparative samples Table 10 indicates that the adhesive samples of the present invention containing a composite powder had a sufficient bonding strength, provided that the bonding temperature was properly selected, i.e., except when the bonding temperature was too low (Sample No. 156) or when the bonding temperature was too high (Sample No. 157). In addition, the samples of the present invention had a bonding strength of 50 kg or more, even after having been subjected to the heat-cycle test, and these were proved to be practically durable. On the other hand, the comparative samples having chemical components outside the scope of the present invention (Sample Nos. 158 to 164), although composite powder adhesives, were impracticable for bonding, or if used for bonding, had poor bonding strength. In addition, the comparative samples peeled in the heat-cycle test, and the bonding strength thereof was extremely poor after the heat-cycle test.

EXAMPLE 11

16 g of Ti powder, 8 g of Ni powder, 32 g of Ag powder, 24 g of Cu powder, 6 g of Si powder and 14 g of SiC powder, each having a particle size of 325 mesh or less, were blended and ground in a grinding mill for about 3 hours to obtain a fine composite powder having a particle size of 10 μm or less.

Next, the composite powder was blended with the following components in order to obtain a paste adhesive.

| | |
|---|---|
| Composite powder | 100 g |
| Ethyl cellulose | 18.3 g |
| Texanol | 20.8 g |
| Polyoxyethylene nonylphenol ether (surfactant) | 2.2 g |

141.3 g of the resulting composition was prekneaded in a universal mixer and then kneaded in a three-roll mill to obtain a paste adhesive.

Next, the paste adhesive was printed on the complete surface of one substrate of the combination of the two substrates as shown in Table 11 with a screen-printer, the substrate samples used having the same size as in the above-mentioned Example 10. The screen used for printing was made of a stainless steel bias sieve of 200 mesh, which gave an emulsion print having a thickness of 45 μm.

After printing, the paste film was leveled at room temperature for 10 minutes and then dried at 105° C. for 30 minutes. After drying, the sample was degreased in a thick film-firing furnace under a nitrogen stream for 60 minutes, at a peak temperature of 600° C. for 8 minutes.

Next, another substrate was superposed on the paste film-coated substrate and they were bonded in a vacuum or in a nitrogen stream atmosphere under a compression load of 0.5 kg/cm$^2$. Regarding the bonding conditions of this example, the samples were heated at 850° C. for one hour under a vacuum of 10$^{-4}$ Torr, or alternatively, the samples were heated for 90 minutes, at a peak temperature of 850° C. for 15 minutes, in a thick film-firing furnace into which a nitrogen gas was fed.

After bonding, the bonding strength of each sample and the strength after a heat-cycle test were investigated in the same manner as in Example 10. The results are set forth in Table 11. As shown in Table 11, the bonded surfaces of the samples of the present invention were not broken. In the bonding strength test, the copper rivet was broken, and the bonding strength of the samples of the present invention proved to be sufficient. In addition, the bonding strength of each sample was 50 kg or more after the heat-cycle test, which is sufficiently durable in practical use. On the other hand, if the degreasing temperature was too high (Sample No. 171), or if the bonding temperature was too low (Sample No. 172), the samples could not be bonded. In addition, if the paste film thickness, after degreasing, was too thin (Sample No. 173), or if the sample was not degreased (Sample No. 174), the bonding strength after the heat-cycle test was poor. In particular, in Sample No. 174, which was not degreased, the metal surface was stained with carbon and the bonded layer contained air bubbles.

TABLE 11

| Sample No. | Combination of substrates | Atmosphere and degreasing temperature (°C.) | Film thickness after degreasing (μm) | Atmosphere and bonding temperature (°C.) | Bonding strength (kg) | Bonding strength after heat-cycle test (kg) |
|---|---|---|---|---|---|---|
| 165 | SiC/Cu | N$_2$ 600 | 47 | vacuum 850 | 150 or more | 91 |

TABLE 11-continued

| Sample No. | Combination of substrates | Atmosphere and degreasing temperature (°C.) | Film thickness after degreasing (μm) | Atmosphere and bonding temperature (°C.) | Bonding strength (kg) | Bonding strength after heat-cycle test (kg) |
| --- | --- | --- | --- | --- | --- | --- |
| 166 | SiC/SUS | " | 38 | " | " | 105 |
| 167 | SiC/SiC | " | 15 | " | " | 131 |
| 168 | SiC/Al$_2$O$_3$ | " | 25 | " | " | 127 |
| 169 | SiC/Cu | " | 27 | N$_2$ 850 | " | 87 |
| 170 | " | " | 45 | " | " | 79 |
| 171* | " | N$_2$ 800 | 38 | vacuum 850 | — | — |
| 172* | " | 600 | 32 | vacuum 700 | — | — |
| 173* | " | " | 8 | vacuum 850 | 74 | 31 |
| 174* | " | not degreased | 41 | N$_2$ 850 | 81 | 25 |

(Note)
*comparative samples

EXAMPLE 12

In the same manner as in Example 11, with the exception that Nb powder or Zr powder each having a particle size of 325 mesh or less was used in place of the Ti powder, two fine composite powders were prepared; one Nb-containing powder ("Powder A"); and the other Zr-containing powder ("Powder B").

Next, each of these powders was blended, prekneaded and kneaded in the same manner as in Example 11 to obtain a paste adhesive.

The paste adhesive thus obtained was printed on one of the combination of the substrates as given in Table 12, dried and degreased and then the other substrate was bonded therewith, also in the same manner as in Example 11.

After bonding, the bonding strength of each sample and the bonding strength after a heat-cycle test were investigated in the same manner as in Example 10. The results are set forth in Table 12. As shown in Table 12, all the samples of the present invention had a sufficient bonding strength, and even after the heat-cycle test, they had a high bonding strength of 50 kg or more, which sufficiently durable for practical use. Sample Nos. 185 and 186 could not be bonded, as the bonding temperature was too low.

TABLE 12

| Sample No. | Composite powder | Combination of substrates | Atmosphere and bonding temperature (°C.) | Bonding strength (kg) | Bonding strength after heat-cycle test (kg) |
| --- | --- | --- | --- | --- | --- |
| 175 | A | SiC/Cu | vacuum 850 | 150 or more | 85 |
| 176 | " | SiC/SUS | " | 150 or more | 108 |
| 177 | " | SiC/SiC | " | 150 or more | 125 |
| 178 | " | SiC/Al$_2$O$_3$ | " | 150 or more | 110 |
| 179 | " | SiC/Cu | N$_2$ 850 | 150 or more | 82 |
| 180 | B | " | vacuum 850 | 150 or more | 75 |
| 181 | " | SiC/SUS | " | 150 or more | 113 |
| 182 | " | SiC/SiC | " | 150 or more | 139 |
| 183 | " | SiC/Al$_2$O$_3$ | " | 150 or more | 118 |
| 184 | " | SiC/Cu | N$_2$ 850 | 150 or more | 80 |
| 185* | A | " | vacuum 700 | — | — |
| 186* | B | " | " | — | — |

(Note)
*reference samples

Examples 10 to 12 illustrate cases in which the powder constituting the adhesive was exclusively (100%) in the form of a composite powder. The same effect can be attained provided that at least 50 wt% of the powder in the adhesive is in the form of a composite powder. In addition, ceramics other than SiC or Al$_2$O$_3$, and metals other than SUS 304 or Cu, can be used as the substrate to be bonded to SiC substrate, and the same bonding effect can also be attained. In particular, the composite powder-containing adhesives of the present invention are especially suitable for bonding composite base plates such as heat-releasing base plates, etc. as well as for bonding heat-resistant and abrasion-resistant composite base plates such as molding parts for manufacturing of floppy discs or heat-generator parts, etc.

While the invention has been described in detail and with reference to specific embodiments thereof, it will be apparent to one skilled in the art that various changes and modifications can be made therein without departing from the spirit and scope thereof.

What is claimed is:

1. An inorganic adhesive consisting essentially of a composite mechanical alloy powder comprising:
   (a) from about 10 to 60 wt% of particles of at least one of Cu and Ni; least one of Ti, Nb, and Zr; and
   (c) from about 10 to 80 wt% of Ag particles.

2. An inorganic adhesive as claimed in claim 1, wherein said composite mechanical alloy powder consists essentially of:
   (a) from about 10 to 60 wt% of particles of at least one of Cu and Ni;
   (b) from about 10 to 80 wt% of particles of at least one of Ti, Nb, and Zr; and
   (c) from about 10 to 80 wt% of Ag particles.

3. An inorganic adhesive as claimed in claim 1, wherein said composite mechanical alloy powder consists essentially of:
   (a) from about 25 to 35 wt% of Cu particles and from about 5 to 15 wt% of Ni particles;
   (b) from about 15 to 25 wt% of particles of at least one of Ti, Nb, and Zr;
   (c) from about 35 to 45 wt% of Ag particles; and (d) from about 1 to 7 wt% of Si particles.

4. An inorganic adhesive as claimed in claim 1, wherein said composite mechanical alloy powder consists essentially of:
 (a) from about 18 to 28 wt% of Cu particles and from about 5 to 10 wt% of Ni particles;
 (b) from about 10 to 20 wt% of particles of at least one of Ti, Nb, and Zr;
 (c) from about 25 to 35 wt% of Ag particles;
 (d) from about 2 to 10 wt% of Si particles; and
 (e) from about 10 to 30 wt% of SiC particles.

5. An inorganic adhesive consisting essentially of a composite mechanical alloy powder consisting essentially of:
 (a) from about 10 to 60 wt% of particles of at least one of Cu and Ni;
 (b) from about 7 to 80 wt% of particles of at least one of Ti, Nb, Zr;
 (c) from about 10 to 80 wt% of Ag particles; and
 (d) from about 5 ppm by weight to 3 wt% of particles comprising at least one rare earth element.

6. An inorganic adhesive as claimed in claim 5, wherein said rare earth element is selected from the group consisting of La, Ce, Pr, Nd, Pm, Sm, Eu, Gd, Tb, Dy, Ho, Er, Tm, Yb, Lu, and Y.

7. An inorganic adhesive as claimed in claim 2, wherein said adhesive is a shaped body consisting essentially of the composite mechanical alloy powder.

8. An inorganic adhesive as claimed in claim 3, wherein said adhesive is a shaped body consisting essentially of the composite mechanical alloy powder.

9. An inorganic adhesive as claimed in claim 4, wherein said adhesive is a shaped body consisting essentially of the composite mechanical alloy powder.

10. An inorganic adhesive as claimed in claim 5, wherein said adhesive is a shaped body consisting essentially of the composite mechanical alloy powder.

11. An inorganic adhesive as claimed in claim 7, wherein said shaped body is a green compact.

12. An inorganic adhesive as claimed in claim 8, wherein said shaped body is a green compact.

13. An inorganic adhesive as claimed in claim 9, wherein said shaped body is a green compact.

14. An inorganic adhesive as claimed in claim 10, wherein said shaped body is a green compact.

15. An inorganic adhesive as claimed in claim 7, wherein said shaped body is a sintered compact.

16. An inorganic adhesive as claimed in claim 8, wherein said shaped body is a sintered compact.

17. An inorganic adhesive as claimed in claim 9, wherein said shaped body is a sintered compact.

18. An inorganic adhesive as claimed in claim 10, wherein said shaped body is a sintered compact.

19. An inorganic adhesive as claimed in claim 7, wherein said shaped body is a sintered and rolled sheet.

20. An inorganic adhesive as claimed in claim 8, wherein said shaped body is a sintered and rolled sheet.

21. An inorganic adhesive as claimed in claim 9, wherein said shaped body is a sintered and rolled sheet.

22. An inorganic adhesive as claimed in claim 10, wherein said shaped body is a sintered and rolled sheet.

23. An inorganic adhesive as claimed in claim 2, wherein said adhesive is paste having the composite mechanical alloy powder dispersed in an organic solvent and binder.

24. An inorganic adhesive as claimed in claim 3, wherein said adhesive is paste having the composite mechanical alloy powder dispersed in an organic solvent and binder.

25. An inorganic adhesive as claimed in claim 4, wherein said adhesive is paste having the composite mechanical alloy powder dispersed in an organic solvent and binder.

26. An inorganic adhesive as claimed in claim 5, wherein said adhesive is paste having the composite mechanical alloy powder dispersed in an organic solvent and binder.

* * * * *